Nov. 10, 1959 G. ROMI 2,911,842
GEAR SELECTING ARRANGEMENT
Filed Oct. 1, 1956 6 Sheets-Sheet 1

INVENTOR:
Giordano Romi
BY: Michael S. Striker
Agt.

Nov. 10, 1959 G. ROMI 2,911,842
GEAR SELECTING ARRANGEMENT
Filed Oct. 1, 1956 6 Sheets-Sheet 2

INVENTOR:
Giordano Romi
BY: Michael S. Striker
Agt.

Nov. 10, 1959  G. ROMI  2,911,842
GEAR SELECTING ARRANGEMENT
Filed Oct. 1, 1956  6 Sheets-Sheet 3

INVENTOR:
Giordano Romi
BY: Michael S. Striker
Agt.

Nov. 10, 1959 G. ROMI 2,911,842
GEAR SELECTING ARRANGEMENT
Filed Oct. 1, 1956 6 Sheets-Sheet 4

INVENTOR:
Giordano Romi
BY: Michael S. Striker
agt.

INVENTOR:
Giordano Romi
BY: Michael S. Striker
Agt.

United States Patent Office 2,911,842
Patented Nov. 10, 1959

2,911,842

GEAR SELECTING ARRANGEMENT

Giordano Romi, Santa Barbara D'Oeste, Brazil

Application October 1, 1956, Serial No. 613,162

Claims priority, application Brazil January 25, 1956

22 Claims. (Cl. 74—352)

The present invention relates to a gear selecting arrangement for machine tools, and more particularly to a single control gear selecting arrangement for a Norton-type variable transmission.

Gear selecting arrangements according to the prior art require at least two different operating members for shifting the variable transmission between the positions corresponding to different gear ratios.

It is one object of the present invention to provide a gear selecting arrangement which is operated by a single manually operated handle.

It is another object of the present invention to provide a gear selecting arrangement for shifting a Norton-type variable transmission by operation of a single operating handle.

It is another object of the present invention to provide a gear selecting arrangement permitting shifting of a Norton-type transmission, and locking of the transmission in a selected position by operation of a single operating handle.

Consequently, it is also an object of the present invention to unlock the transmission by operation of a single manually operated handle before the transmission is shifted by operation of the same handle.

Another object of the present invention is the provision of a single operating means for shifting and locking a transmission which is completely enclosed in a housing.

It is another object of the present invention to shift the transmission by a control mechanism which is completely enclosed in a housing and operated by a single operating handle located outside of the housing.

Another object of the present invention is the provision of indicating means for indicating the positions of the operating handle and consequently for indicating the selected gear ratios.

Another object of the present invention is to provide indicating means indicating data of a thread cut in a selected position of the gear transmission if the gear transmission is provided in a thread cutting machine tool.

Another object of the present invention is to provide a single operating handle which is turnable in one direction for moving gears of the transmission into and out of meshing engagement, and is connected to a turnable member for shifting the gears of the transmission between different selecting positions corresponding to different gear ratios.

It is also an object of the present invention to provide a variable gear transmission which reliably operates under control of a single operating means.

With these objects in view, the present invention is preferably used with a variable gear transmission, of the Norton type including a set of first stepped gears having a common axis, and a second gear for selectively cooperating with the first gears.

A gear selecting arrangement according to the present invention comprises, in combination, a supporting member for the second gear, and supporting means extending parallel to the axis of the first gears and supporting the supporting member for movement in axial direction between a plurality of axially displaced selecting positions in which the second gear is respectively located opposite one of the first gears. The supporting means supports the supporting member in each of the selecting positions for movement in transverse direction toward and away from the respective first gear between an inoperative position and an operative position in which the second gear meshes with the respective first gear. For instance, in a Norton-type gear transmission the supporting means is a grooved shaft which supports the supporting member carrying the movable second gear for movement in axial direction of such grooved shaft. The gear selecting arrangement of the present invention further comprises control means for moving the supporting member in axial direction between the selecting positions, and for moving the supporting member in transverse direction between the inoperative and operative positions thereof. A single manually operated operating means operates the control means.

Preferably, locking means are provided for locking the supporting member in each of the selecting positions in the respective operative positions. The locking means are also controlled by the control means so that the locking means are released before the supporting member is moved from operative positions to inoperative positions, and before the supporting member is shifted between the selecting positions. The control means also controls the locking means to lock the supporting member in each of the operative positions whereby a reliable operation of the gear transmission is assured. Since the control means operate the supporting member and the locking means, the single manually operated operating means controls both operations.

The single manually operated operating means includes a turnable operating member which controls the movement of the supporting member between the selecting positions, and a single handle lever mounted on the operating member for turning movement about an axis transverse to the axis of the operating member, and controlling the movement of the supporting member between inoperative and operative positions. Such movement of the handle lever relative to the turnable operating member also effects operation of the locking means.

According to a preferred embodiment of the present invention, the control means include movable cam means operated by the handle lever and controlling the movement of the supporting member between inoperative and operative positions, as well as the locking means through suitable cam follower members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
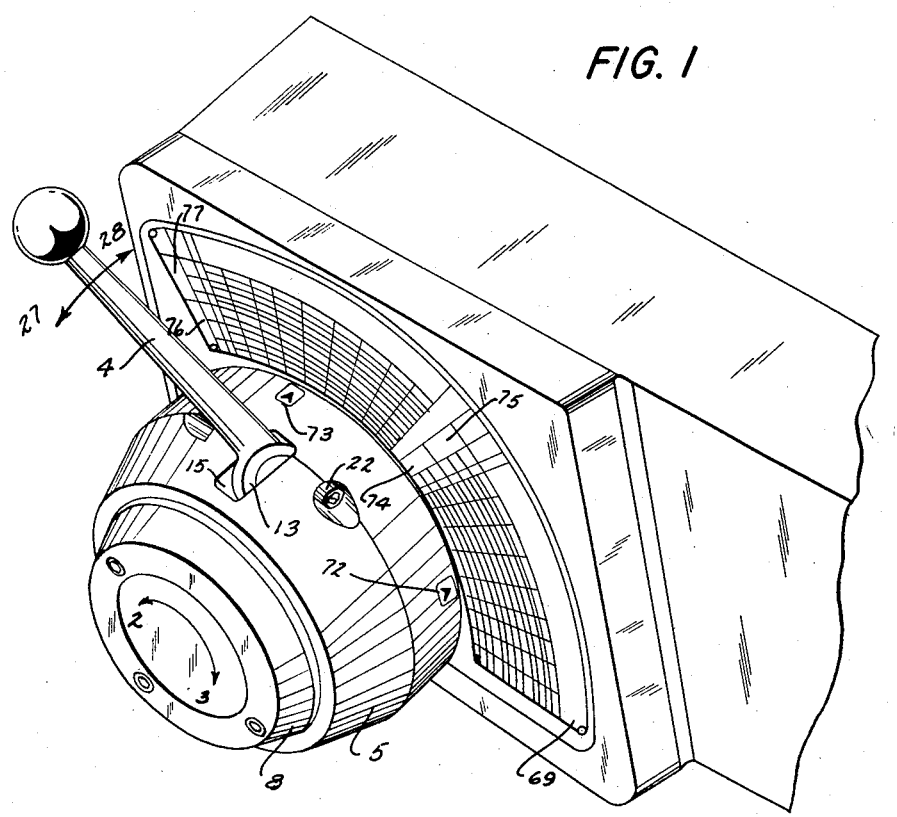
Fig. 1 is a fragmentary isometric view of the single operating means according to the present invention for controlling the gear transmission.
Figure 2:
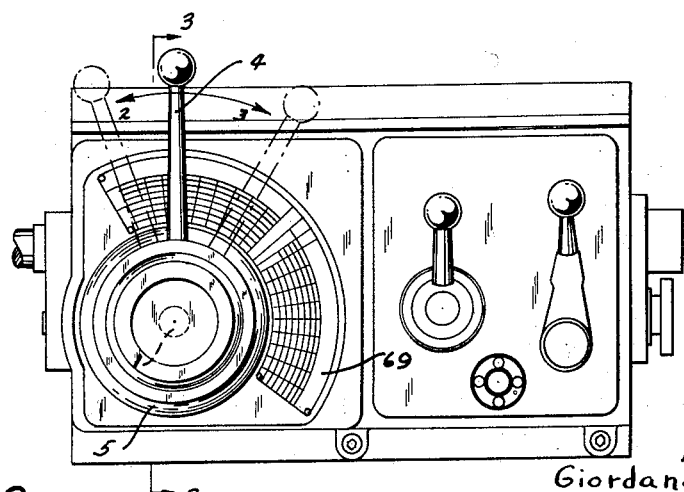
Fig. 2 is a front view of the single operating means according to the present invention.

Referring now to the drawings, and more particularly to Figs. 1 and 2 which show the single operating means by which the gear transmission is shifted in accordance with the present invention, the single operating means includes a turnable operating member 5, and an operating handle lever 4 which is turnably mounted on the operating member 5. The handle 4 can be shifted in the direction of the arrows 27 and 28, and when the handle 4 is turned in the directions of the arrows 2 and 3 in Fig. 2, the operating member 5 turns with the handle 4. Indicating pointer means 72 and 73 are attached to the turnable operating member 5, and cooperate with a dial 69 on which indicia indicate the pitch of threads, or gear ratios or other related data. The dial includes several sections which are indicated by reference numerals 74, 75, 76, and 77. In accordance with the present invention it is only necessary to manually turn the handle 4 together with the turnable operating member 5 into a position in which the pointers 72 and 73 indicate a selected position of the transmission, whereupon operation of the handle 4 in directions of the arrows 27 and 28 effects shifting of the gears of the controlled transmission into a meshing position. At the same time, the gear transmission is locked in meshing position of the gears, as will be described hereinafter in greater detail.

Figure 3:
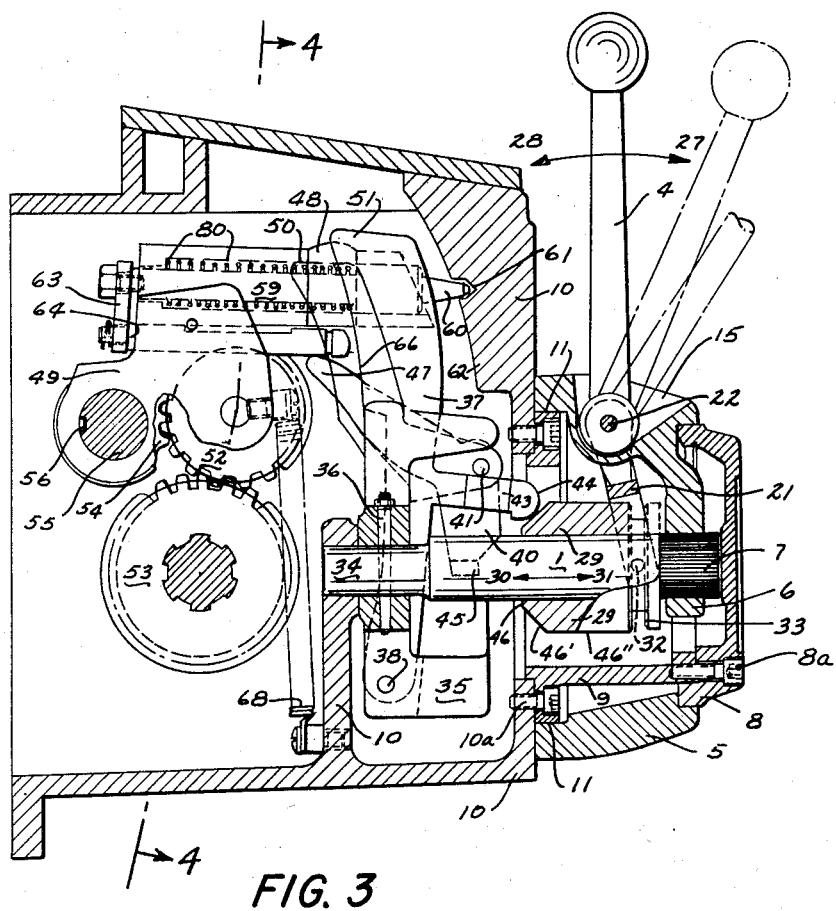
Fig. 3 is a sectional view taken on line 3—3 in Fig. 2 illustrating the arrangement of the present invention in an operational position in which the gears of the gear transmission are in meshing engagement.
Figure 6:
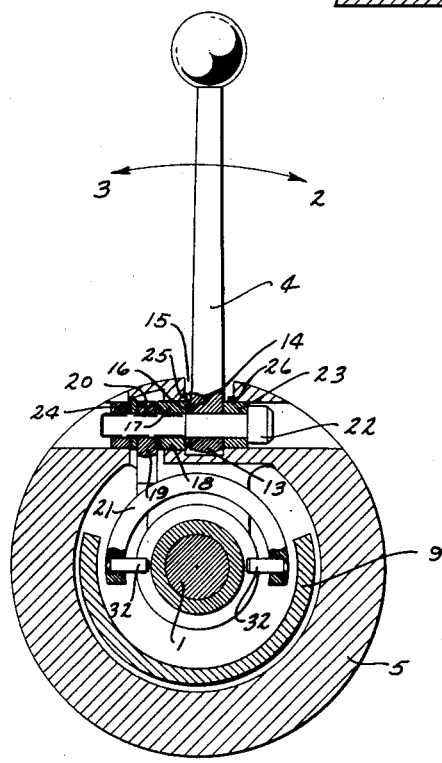
Fig. 6 is a cross sectional view taken on line 6—6 in Fig. 5.
Figure 9:
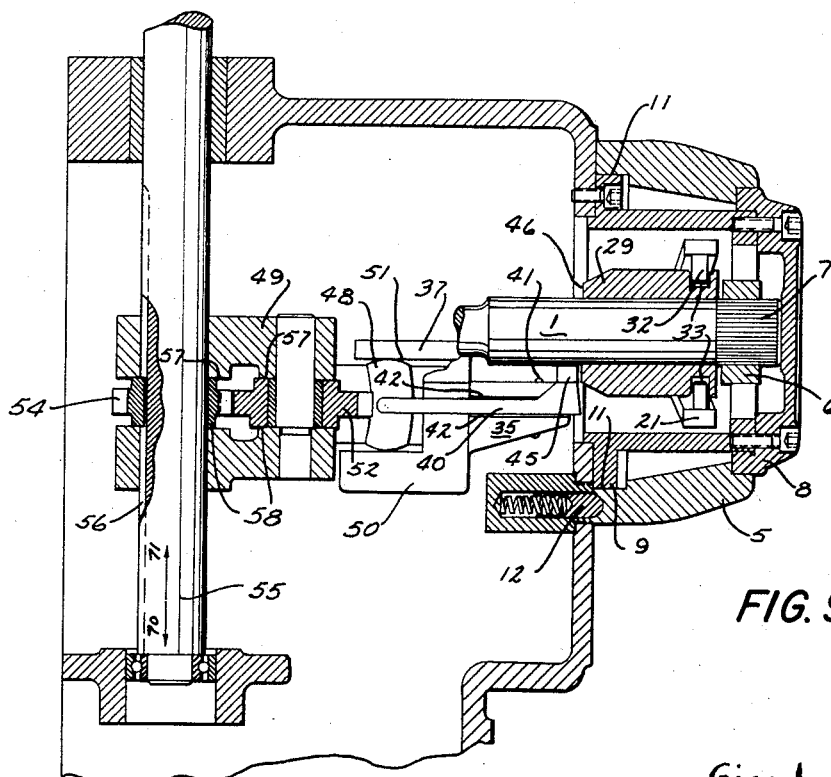
Fig. 9 is a sectional view taken on line 9—9 in Fig. 7.

The inner construction of the operating means is best seen in Figs. 3, 6, and 9. The operating member is an annular element which abuts against a face of the housing front plate 10, and is held in place by a cover 8 which is fixedly connected to the front wall of the housing. An arcuate flange member 9 is secured to the housing walls 10 by screws 10a, and receives screws 8a which pass through the cover 8. The cover 8 is secured to the arcuate member 9, which is best seen in Fig. 6, in such manner that a turning of the operating member 5 relative to the housing is possible. A cylindrical surface 11 of the flange member 9 guides the operating member for turning movement about the axis of the shaft 1. Catch pins 12, best seen in Fig. 9, are urged by spring means into corresponding recesses of the operating member 5 for arresting the operating member 5 in angularly displaced positions in which the indicating pointers 72 and 73 are located opposite radial columns of the dial 69 as shown in Fig. 1. Although a plurality of ranges is shown on the dial 69, and two indicating pointers are provided, it is sufficient for the purposes of the present invention to assume that only a single pointer cooperating with a single dial scale corresponding to one range of transmission is provided. The other indications illustrated in Fig. 1 and in Fig. 2 are used in connection with additional transmission means which are not an object of the present invention.

The inner end portion 13 of the handle lever 4 is mounted on a pin 22 which is arranged in a transverse bore of the operating member 5, as best seen in Fig. 6. Portion 13 has a lateral serrated face 14 which engages a serrated face 16 of a bushing 17. The pin 22 has a thread, and in addition to the bushing 17, a nut 24 is threaded on the threaded portion of pin 22 for securing an annular portion 20 to the pin 22. The annular portion 20 is fixedly connected to a fork member 21 including a pair of pins 32. A washer is arranged between the nut 24 and the portion 20. On the other side of the handle portion 13, a bushing 23 is arranged and held in place by the head of the pin 22. The members 23, 17 and 24 have cylindrical outer surfaces, and support the handle lever 4 for turning movement in the operating member 5, and it will be noted that the axis about which the handle lever 4 turns is transverse to the axis of the shaft 1 which is also the turning axis of the operating member 5.

The portion 20 of the fork member 21 has a serrated face 19 which is located opposite the serrated face 18 of the bushing 17. The serrated faces 18 and 19, and the serrated faces 14 and 16 couple the fork member 21 to the operating handle lever 4, so that turning of the operating lever in direction of the arrows 27 and 28 in Fig. 3 will result in a corresponding movement of the fork member 21. After loosening the nut 24 it is possible to adjust the relative annular position between the handle lever 4 and the fork member 21 by means of the serrated faces 14, 16, 18 and 19. The serrated faces 14 and 16 have one serration more than the faces 18 and 19, and consequently it is possible to adjust the angular position of the fork member 21 relative to the handle lever 4 approximately every 2°. The handle lever 4 projects into a slot 15 of the turnable operating member 5, so that lateral movement of the handle lever 4 is prevented by the faces 25 and 26 which are arranged with the necessary play opposite the portion 13 of the handle lever 4.

The control shaft 1 has an end portion provided with serrations which engages a corresponding bore in a hub portion 6 of the operating member 5. Consequently, shaft 1 is coupled to the operating member 5, and when the handle lever 4 is operated in direction of the arrows 2 and 3 in Fig. 6, the control shaft 1 turns therewith.

Figure 4:
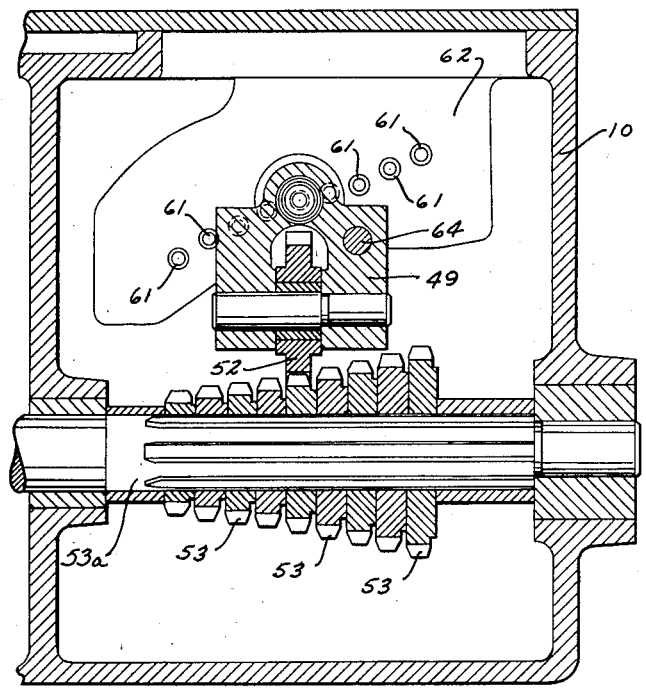
Fig. 4 is a sectional view taken on line 4—4 in Fig. 3.

A cam means 29 is mounted on the control shaft 1, and is provided with a circular groove or slot 33 into which the pins 32 project. Consequently, turning of the handle lever 4 in direction of the arrows 27 and 28 will produce a shifting of the fork member 21 in an opposite direction, and a shifting of the control cam means 29 in axial direction of the control shaft 1. The control cam means 29 is movable in direction of the arrows 30 and 31 under the control of the operating handle lever 4. The control cam means 29 has a front face including an annular inner portion 46, and an oblique portion 46'. Adjacent to the oblique face 46' the cylindrical outer surface 46" is located. During shifting of the control cam means in axial direction, the oblique face portion 46' and the cylindrical face 46" cooperate with a cam follower 44 of a cam follower projection 43 which projects from the locking control lever 37 whose operation will be described hereinafter in greater detail. The annular front face 46 of the control cam means 29 cooperates with a cam follower portion 45 of a control member 40. The control cam means 29 is a part of control means by which a variable gear transmission is shifted. The variable gear transmission is preferably a Norton-type transmission, and is best seen in Figs. 3 and 4. A set of first gears 53 is secured to a shaft 53a, and the gears 53 are of different diameter. A drive shaft 55 extends parallel to the axis of the gears 53, and constitutes a supporting means for a supporting member 49. A pinion 54 is keyed to the drive shaft 55 which has a longitudinally extending spline 56, which is best seen in Fig. 9. The pinion 54 meshes with a gear 52, which will be hereinafter referred to as second gear, and when the supporting member 49 is moved in axial direction of the supporting means 55 in direction of the arrows 70 and 71, the second gear 52 can be placed in a plurality of selecting positions in which the second gear is respectively located opposite one of the first gears 53. It will be understood, that while pinion 54 and the second gear 52 are connected to the drive shaft 55 for rotation therewith in any of the selected positions, the supporting member 49 slides on the drive shaft 55, and is also turnable about the axis of the drive shaft 55, which with respect to the supporting member 49, constitutes a supporting means supporting the supporting member 49 for movement in a direction parallel to the axis of the first gears 53, and also for movement in a transverse direction toward and away from the gears 53. The supporting member 49 is operated by control means including the control cam means 29, as will be described hereinafter in greater detail.

Figure 7:
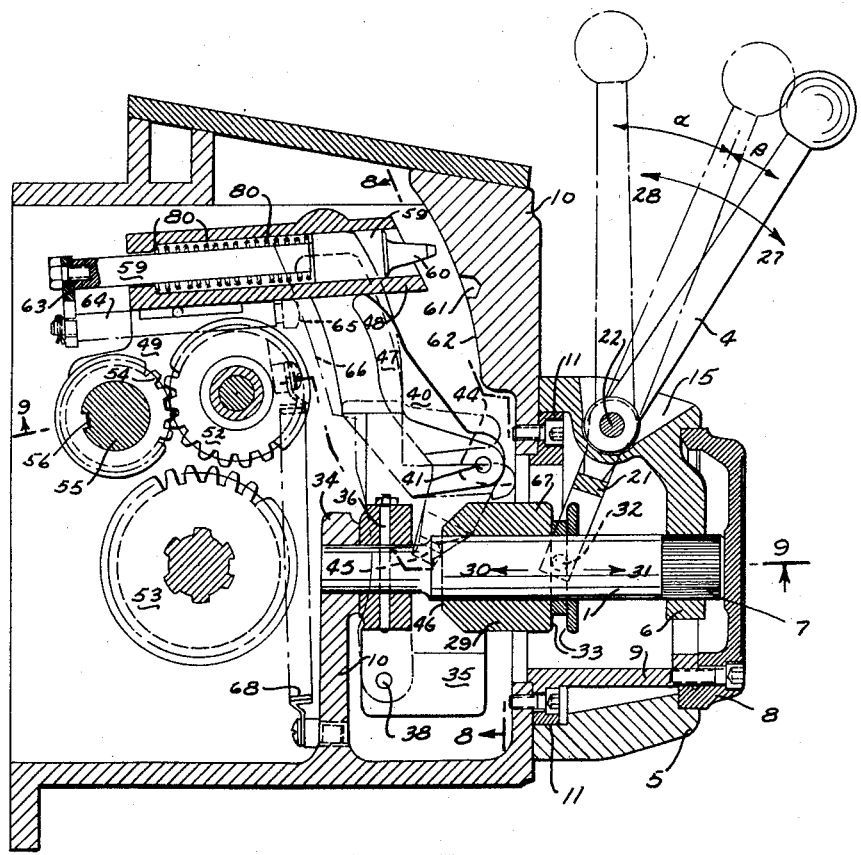
Fig. 7 is a sectional view taken on line 3—3 in Fig. 2 and illustrating a further operational position of the arrangement.

The supporting member 49 for the second gear 52 has a tubular extension 48 in which is arranged a cylindrical stem 59, as best seen in Fig. 7. The free end of the stem 59 has a tapered point 60 acting as a catch. A spring 80 is arranged in the tubular extension 48 and urges the catch 60 into an advanced position. A stationary locking member 62 is arranged opposite the catch means 60, and provided with a plurality of locking recesses 61 which are arranged spaced from each other and respectively associated with the first gears 53. The resilient catch means 59, 60, 80 and the locking recesses 61 constitute a locking means for locking the supporting member 49 in a plurality of positions in which the second gear 52 is located opposite one of the first gears 53, and in meshing engagement with respective first gear 53. It will be understood that it is necessary to retract the catch means 60, 59 from the respective locking recess 61 before the supporting member 49 and the second gear 52 are shifted in the direction of the axis of the supporting means 55. A connecting link 63, see Fig. 7, is secured to the other end of the stem 59, and carries an engaging member 64 illustrated to be a stem extending parallel to stem 58 in the supporting member 49. The free end of the engaging member 64 cooperates with a locking control member 37 whose projection 43 and cam follower 44 has been previously described.

The control means of the present invention by which the gear transmission is unlocked, shifted and locked, includes in addition to the cam means 29 and to the control shaft 1, three control members.

Figure 8:
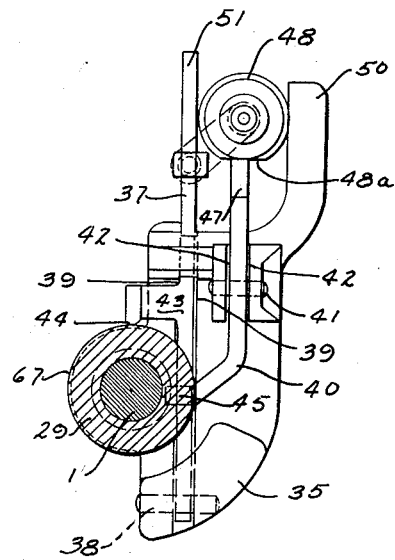
Fig. 8 is a cross sectional view taken on line 8—8 in Fig. 7.

A first control member 35 is fixedly secured to the portion 34 of control shaft 1 by means of a pin 36. As best seen in Fig. 8, the first control member 35 has an upper end portion 50 which is arranged on one side of the tubular extension 48. A locking control lever 37 is pivotally mounted on the first control member by means of a pivot pin 38, and is slidable in a slot 39 of the first control member 35, as best seen in Fig. 8. The locking control member 37 has an upper end portion 51, which is located on the other side of the tubular extension 48, and cooperates with the portion 50 of the first control member 35 to guide the tubular extension 48 in a plane which is transverse to the axis of the supporting means 55. Due to the arrangement of the axis of the pivot pin 38, the distance between the guide faces of the portions 51 and 50 is invariable, although the locking control lever 37, 51 can move relative to the first control member 35, 50 in a transverse plane.

A second operating member 40 is pivotally mounted on the first operating member 35 for pivotal movement about the pin 41, and is slidable in a slot 42 of the first control member 35, as best seen in Fig. 8.

The second control member 40 has a cam follower portion 45 cooperating with the annular face 46 of the cam means 29, and a free end portion 47 which cooperates with the tubular extension 48, and abuts against a flat face 48a of the tubular extension 48. Consequently pivotal movement of the second control member 40 will result in a turning of the tubular extension 48, together with the supporting member 49 about the supporting means 55. Since the second gear 52 is supported on the supporting member 49, as best seen in Fig. 3, movement of the supporting member 49 with the extension 48 will result in movement of the second gear 52 between an operative position in Fig. 3 in which the gear 52 meshes with one of the gears 53, and an inoperative position in which the second gear 52 is out of engagement with the gears 53 as shown in Fig. 7.

The arrangement illustrated in the drawing operates in the following manner:

The handle lever 4 is pulled outward in direction of the arrow 27. During such movement, the handle lever 4 turns about its axis in the operating member 5, and the fork member 21 turns with handle lever 4, while the operating member 5 does not turn due to the fact that the handle lever 4 moves in a plane passing through the axis of the operating member 5. During such outward movement of the handle lever 4 in the direction of the arrow 27 three distinct operations are performed by the control means.

Figure 5:
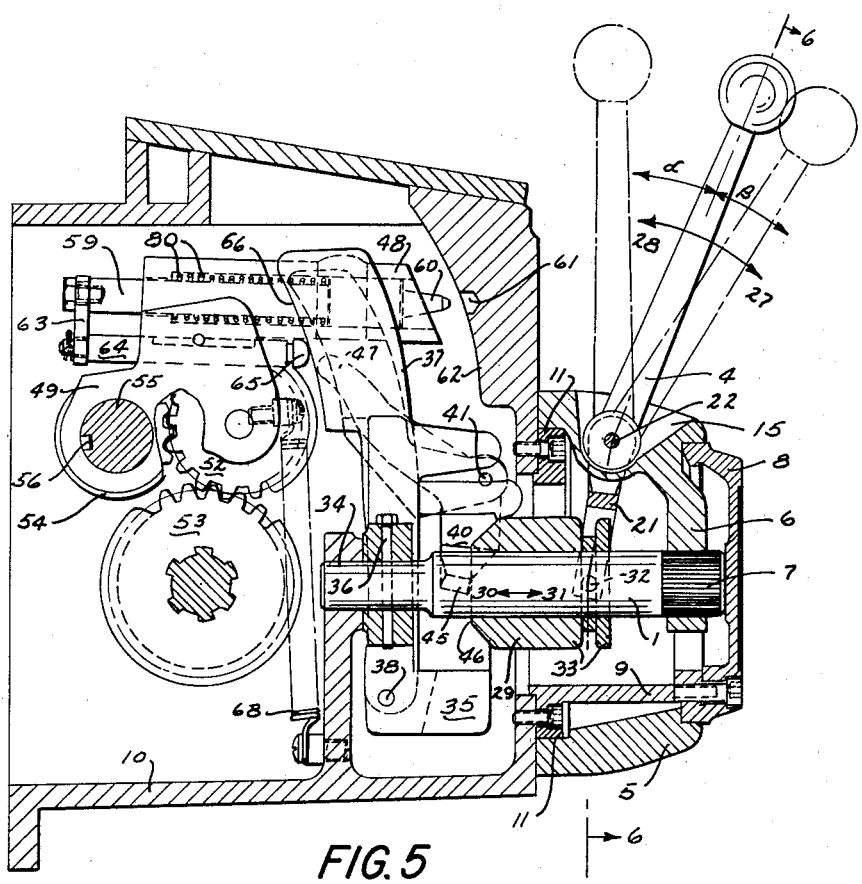
Fig. 5 is a sectional view taken on line 3—3 in Fig. 2 and illustrating the arrangement in another operational position.

While the handle lever 4 moves through the angle α, see Fig. 5, the control cam means moves in axial direction of the shaft 1 in direction of the arrow 30 and under the action of the fork member 21. The control cam means 29 moves out of the position shown in Fig. 3, and the oblique cam face 46' engages the cam follower 44, 43 of the locking control lever 37, 51. The edge 66 of the locking control lever 37 engages the free end of the stem 64, and during movement of the cam follower 44 along the oblique face of the cam means 29, the stems 64 and 59 are retracted until the catch 60 is withdrawn from the locking recess 61. During such operation of the locking control lever 37, the resilient means 80 are compressed. Further movement of the cam means 29 in direction of the arrow 30 under the action of the motion of the handle lever 4, will place the cam means 29 in a position in which the cam follower portion 44 rides on the cylindrical face 46" of the cam means 29. Regardless of further movement of the cam means 29, the locking control lever 37 will not be further pivoted about pivot pin 38, since the cylindrical face 46" does not exert a cam action on the locking control lever 37. Consequently the locking control lever 37 remains and is held in the position illustrated in Fig. 5 in which the catch 60 is retracted, and the locking means released. It will be understood that turning of the operating handle lever 4 through the angle α, will only result in shifting of the locking control lever 37, and in release of the locking means.

Further pulling of the handle lever 4 in the direction of the arrow 27 will result in an angular movement of the handle lever 4 through an angle β. During such angular displacement of the handle lever 4 and of the fork member 21, the cam means 29 will further move in the direction of the arrow 30 with the cam follower portion 44 sliding on the cylindrical cam face 46". While the locking control lever 37 remains inoperative during such further movement of the cam means 29, the annular face 46 of the cam means 29 engages the portion 45 of the second control member 40, which is pivoted about pivot pin 41. The moment of engagement between the face 46 and the portion 45 of the control member 40 is illustrated in Fig. 5. Further movement of the cam means 29 in direction of the arrow 30 will turn the second control member 40 into the position shown in Fig. 7 in which its upper end portion 47 engages the flat face 48a of the tubular extension 48 and pushes the free end of the tubular extension 48 in upward direction. A spring means 68 is secured at one end thereof to the housing, and at the other end to the supporting member 49 so that the force of spring 68 urges the tubular extension against the free end of the second control member 47. The cam action overcomes the resilient force of the spring 68 and the tubular extension is raised so that the supporting member 49 turns about the supporting shaft means 55 so that the gear 52 is moved to the inoperative position shown in Fig. 7 in which the meshing engagement between the gear 52 and the respective gear 53 of the set of gears 53 is interrupted.

In this position the supporting member 49 with its extension 48 is free to move in axial direction along the supporting shaft 55 since the locking means 60 and 61 were previously released by the locking control lever 37, 51, 66, and the meshing engagement between the gears 52 and 53 is interrupted.

In this position, the handle lever 4 is turned either in the direction of arrow 2 or in the direction of arrow 3 as shown in Figs. 1 and 2. Such movement of the handle lever 4 effects turning of the operating member 5 together with shaft 1, and since the operating members 35, 37 and 40 are fixedly connected to shaft 1 by pin 36, the two upper portions 50 and 51 of the operating member 35 and of the locking control lever 37 will turn about the axis of shaft 1. As will be best seen with reference to Fig. 8, a turning of the two portions 50 and 51 about the axis of shaft 1 will result in a movement of the tubular extension 48 in direction of the supporting means 55. The tubular extension 48 moves together with the supporting member 49, so that the supporting member 49 is shifted in axial direction of the shaft 55, whereby the gear 52 is shifted along the axis of the set of gears 53 until it is located opposite one of the gears 53 which has been selected by placing the pointer 72, or the pointer 73, opposite a suitable indication on the dial 69.

However, the gear 52 is still spaced from the respective gear 53, and in order to obtain a meshing engagement between the respective gear 53 and the gear 52, it is necessary to again operate the handle lever 4 in a direction opposite to the previous direction of operation.

The handle lever is moved in direction of the arrow 28, and during the first part of such movement the handle lever 4 moves through the angle $\beta$, and the cam means 29 moves on shaft 1 in direction of the arrow 31 so that the face 46 is withdrawn from the portion 45 of the operating member 40 permitting movement of the supporting member 49 and of the extension 48 under the action of the spring means 68. The supporting member 49 turns about the supporting shaft means 55, until the second gear 52 engages the opposite first gear 53 in accordance with the previously selected position. The gears 52 and 53 are now in an operative position in which the driving force of the shaft 55 is transmitted from pinion 54 through gear 52 to the respective gear 53 whereby the shaft 53a is driven at a speed determined by the ratio between the meshing gears 54, 52 and 53. Such ratio may correspond to a certian thread selected by operation of the operating member 5 and indicated on the dial 69 by the pointers 72 and 73.

The handle lever 4 is now further moved in direction of the arrow 28 and is angularly displaced by the angle $\alpha$ until the cam means 29 releases the cam follower portion 44 of the locking control lever 37, so that the edge 66 of the locking control lever 37 releases the free end of the engaging member 64 permitting movement of the stem 59 with catch member 60 under the action of spring 80 into a position in which the catch member 60 engages the locking recess 61 which is associated with the respective selected gear 53. In this position, the mechanism is ready for operation, since a pair of gears 52 and 53 is in meshing engagement, and the transmission is locked by the locking means 60 and 61.

It will be understood that each of the elements described above, or two or more together, may also find a useful application in other types of gear selecting arrangements differing from the types described above.

While the invention has been illustrated and described as embodied in a gear selecting arrangement for a Norton-type transmission which is operated by a single operating means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use with a variable gear transmission including a set of first stepped gears having a common axis, and a second gear for selectively cooperating with said first gears, a gear selecting arrangement comprising, in combination, a supporting member for supporting the second gear; supporting means extending parallel to the axis of said first gears and supporting said supporting member for movement in axial direction between a plurality of axially displaced selecting positions in which the second gear is respectively located opposite one of said first gears, said supporting means supporting said supporting member in each of said selecting positions for movement in transverse direction toward and away from the respective first gear between an inoperative position and an operative position in which the second gear meshes with the respective first gear; locking means for locking said supporting member in each of said selecting positions in the respective operative position; control means for moving said supporting member in axial direction between said selecting positions and in said transverse direction between said inoperative and operative positions, said control means being connected to said locking means for releasing said locking means before moving said supporting member from said operative position to said inoperative position and before said control means move said supporting member in axial direction between said selecting positions, and for actuating said locking means to lock said supporting member in each of said operative positions; and a single manually operated operating means for operating said control means.

2. For use with a variable gear transmission including a set of first stepped gears having a common axis, and a second gear for selectively cooperating with said first gears, a gear selecting arrangement comprising, in combination, a supporting member for supporting the second gear; supporting means extending parallel to the axis of said first gears and supporting said supporting member for movement in axial direction between a plurality of axially displaced selecting positions in which the second gear is respectively located opposite one of the said first gears, said supporting means supporting said supporting member in each of said selecting positions for movement in transverse direction toward and away from the respective first gear between an inoperative position and an operative position in which the second gear meshes with the respective first gear; control means for moving said supporting member in axial direction between said selecting positions and in said transverse direction between said inoperative and operative positions; and a single manually operated operating means connected to said control means for actuating the same, said operating means including an operating member connected to said control means and being turnable about a first axis for operating said control means to move said supporting member between said selecting positions, and including a single handle lever turnably mounted on said operating member for turning movement about a second axis extending transverse to said first axis of said operating member, said lever handle being connected to said control means for operating the same to move said supporting member in said transverse direction between said inoperative and operative positions, said handle lever being connected to said operating member for movement with the same about said first axis so that said operating member is turned by operation of said handle lever.

3. For use with a variable gear transmission including a set of first stepped gears having a common axis, and a second gear for selectively cooperating with said first gears, a gear selecting arrangement comprising, in combination, a supporting member for supporting the second gear; supporting means extending parallel to the axis of said first gears and supporting said supporting member for movement in axial direction between a plurality of axially displaced selecting positions in which the second gear is respectively located opposite one of said first gears, said supporting means supporting said supporting member in each of said selecting positions for movement in transverse direction toward and away from the respective first gear between an inoperative position and an operative position in which the second gear meshes with the respective first gear; control means for moving said supporting member in axial direction between said selecting positions and in said transverse direction between said inoperative and operative positions, said control means including movable cam means, and cam follower means cooperating with said cam means and being connected to said supporting member for moving the same in accordance with the movements of said cam means; and a single manually operated operating means for operating said control means, said operating means including an operating member connected to said control means and being turnable about a first axis for operating said control means to move said supporting member between said selecting positions, and including a handle member turnably mounted on said operating member for turning movement about a second axis extending transverse to said first axis, said handle member being connected to said cam means for operating the same to move said supporting member between said inoperative and operative positions, said handle member being movable with said operating member about said first axis and being connected to said cam means for moving the same.

4. For use with a variable gear transmission including a set of first stepped gears having a common axis, and a second gear for selectively cooperating with said first gears, a gear selecting arrangement comprising, in combination, a supporting member for supporting the second gear; supporting means extending parallel to the axis of said first gears and supporting said supporting member for movement in axial direction between a plurality of axially displaced selecting positions in which the second gear is respectively located opposite one of said first gears, said supporting means supporting said supporting member in each of said selecting positions for movement in transverse direction toward and away from the respective first gear between an inoperative position and an operative position in which the second gear meshes with the respective first gear; control means for moving said supporting member in axial direction between said selecting positions and in said transverse direction between said inoperative and operative positions, said control means including movable cam means, and cam follower means cooperating with said cam means and being connected to said supporting member for moving the same in accordance with the movements of said cam means between said operative positions to said inoperative positions; and a single manually operated operating means for operating said control means, said operating means including an operating member connected to said control means and being turnable about a first axis for operating said control means to move said supporting member between said selecting positions, and including a handle member turnably mounted on said operating member for turning movement about a second axis extending transverse to said first axis, said handle member being connected to said cam means for operating the same to move said supporting member between said inoperative and operative positions, said handle member being movable with said operating member about said first axis.

5. For use with a variable gear transmission including a set of first stepped gears having a common axis, and a second gear for selectively cooperating with said first gears, a gear selecting arrangement comprising, in combination, a supporting member for supporting the second gear; supporting means extending parallel to the axis of said first gears and supporting said supporting member for movement in axial direction between a plurality of axially displaced selecting positions in which the second gear is respectively located opposite one of said first gears, said supporting means supporting said supporting member in each of said selecting positions for movement in transverse direction toward and away from the respective first gear between an inoperative position and an operative position in which the second gear meshes with the respective first gear; locking means for locking said supporting member in each of said selecting positions in the respective operative position; control means for moving said supporting member in axial direction between said selecting positions and in said transverse direction between said inoperative and operative positions, said control means including movable cam means, and cam follower means cooperating with said cam means and being connected to said supporting member for moving the same in accordance with the movements of said cam means between said operative positions to said inoperative positions, said cam follower means being connected to said locking means for releasing said locking means before moving said supporting member from said operative position to said inoperative position and before said control means move said supporting member in axial direction between said selecting positions, and for actuating said locking means to lock said supporting member in each of said operative positions; and a single manually operated operating means for operating said control means and being connected to said cam means for moving the same.

6. For use with a variable gear transmission including a set of first stepped gears having a common axis, and a second gear for selectively cooperating with said first gears, a gear selecting arrangement comprising, in combination, a supporting member for supporting the second gear; supporting means extending parallel to the axis of said first gears and supporting said supporting member for movement in axial direction between a plurality of axially displaced selecting positions in which the second gear is respectively located opposite one of said first gears, said supporting means supporting said supporting member in each of said selecting positions for movement in transverse direction toward and away from the respective first gear between an inoperative position and an operative position in which the second gear meshes with the respective first gear; control means for moving said supporting member in axial direction between said selecting positions and in said transverse direction between said inoperative and operative positions, said control means including movable cam means, and cam follower means cooperating with said cam means and being connected to said supporting member for moving the same in accordance with the movements of said cam means between said operative positions to said inoperative positions; and a manually operated operating means connected to said control means for actuating the same, said operating means being movable in said transverse direction for operating said cam means to move said supporting member in said transverse direction between said inoperative and operative positions, and being turnable about an axis extending in said transverse direction for operating said control means to move said supporting member between said selecting positions.

7. For use with a variable gear transmission including a set of first stepped gears having a common axis, and a second gear for selectively cooperating with said first gears, a gear selecting arrangement comprising, in combination, a supporting member for supporting the second gear; supporting means extending parallel to the axis of said first gears and supporting said supporting member for movement in axial direction between a plurality of axially displaced selecting positions in which the second gear is respectively located opposite one of said first gears, said supporting means supporting said supporting member in each of said selecting positions for turning movement in transverse direction toward and away from the respective first gear between an inoperative position and an operative position in which the second gear meshes with the respective first gear; a control shaft; a control cam means mounted on said control shaft for movement along the same; first control members connected to said control shaft for turning movement therewith, said first control members being connected to said supporting member for moving said supporting member in said axial direction during turning of said control shaft; a second turnable control member having a cam follower portion cooperating with said control cam means, said second control member engaging said supporting member for moving the same from said operative positions to said inoperative positions; and a single manually operated operating means connected to said control cam means for moving the same, and connected to said control shaft for turning the same.

8. For use with a variable gear transmission including a set of first stepped gears having a common axis, and a second gear for selectively cooperating with said first gears, a gear selecting arrangement comprising, in combination, a supporting member for supporting the second gear; supporting means extending parallel to the axis of said first gears and supporting said supporting member for movement in axial direction between a plurality of axially displaced selecting positions in which the second gear is respectively located opposite one of said first gears, said supporting means supporting said supporting member in each of said selecting positions for turning movement in transverse direction toward and away from the respective first gear between an inoperative position and an operative position in which the second gear meshes with the respective first gear; a control shaft extending in said transverse direction; a control cam means mounted on said control shaft for movement in said transverse direction; first control members connected to said control shaft for turning movement therewith, said first control members being connected to said supporting member for moving said supporting member in said axial direction during turning of said control shaft; a second turnable control member having a cam follower portion cooperating with said control cam means, said second control member engaging said supporting member for moving the same from said operative positions to said inoperative positions; a single manually operated operating means including an operating member connected to said control shaft for turning movement therewith, and an operating handle lever mounted on said operating member for turning movement about an axis extending transverse to said control shaft and being connected to said operating member for turning movement with the same, said handle lever being connected to said cam means for moving the same on said control shaft; and indicating means for indicating the angular displacement of said operating member so as to indicate said selecting positions, and thereby transmission ratios.

9. For use with a variable gear transmission including a set of first stepped gears having a common axis, and a second gear for selectively cooperating with said first gears, a gear selecting arrangement comprising, in combination, a supporting member for supporting the second gear; supporting means extending parallel to the axis of said first gears and supporting said supporting member for movement in axial direction between a plurality of axially displaced selecting positions in which the second gear is respectively located opposite one of said first gears, said supporting means supporting said supporting member in each of said selecting positions for turning movement in transverse direction toward and away from the respective first gear between an inoperative position and an operative position in which the second gear meshes with the respective first gear; a control shaft extending in said transverse direction; a control cam means mounted on said control shaft for movement in said transverse direction; a pair of first control members connected to said control shaft for turning movement therewith, said first control members being respectively located on opposite sides of said supporting member for guiding the same in said transverse direction, and for moving said supporting member in said axial direction during turning of said control shaft; a second turnable control member mounted on one of said first control members for turning movement and having a cam follower portion cooperating with said control cam means, said second control member engaging said supporting member for moving the same from said operative positions to said inoperative positions; spring means connected to said supporting member for urging the same to said operative positions; and a single manually operated operating means connected to said control cam means for moving the same, and connected to said control shaft for turning the same.

10. For use with a variable gear transmission including a set of first stepped gears having a common axis, and a second gear for selectively cooperating with said first gears, a gear selecting arrangement comprising, in combination, a supporting member for supporting the second gear; supporting means extending parallel to the axis of said first gears and supporting said supporting member for movement in axial direction between a plurality of axially displaced selecting positions in which the second gear is respectively located opposite one of said first gears, said supporting means supporting said supporting member in each of said selecting positions for turning movement in transverse direction toward and away from the respective first gear between an inoperative position and an operative position in which the second gear meshes with the respective first gear; a control shaft extending in said transverse direction; a control cam means mounted on said control shaft for movement in said transverse direction; a pair of first control members connected to said control shaft for turning movement therewith, said first control members being respectively located on opposite sides of said supporting member for guiding the same in said transverse direction, and for moving said supporting member in said axial direction during turning of said control shaft; a second turnable control member mounted on one of said first control members for turning movement and having a cam follower portion cooperating with said control cam means, said second control member engaging said supporting member for moving the same from said operative positions to said inoperative positions; spring means connected to said supporting member for urging the same to said operative positions; a single manually operated operating means including an operating member connected to said control shaft for turning movement therewith, and an operating handle lever mounted on said operating member for turning movement about an axis extending transverse to said control shaft and being connected to said operating member for turning movement with the same, said handle lever being connected to said cam means for moving the same on said control shaft; and indicating means for indicating the angular displacement of said operating member so as to indicate said selecting positions, and thereby transmission ratios.

11. A gear selecting arrangement as set forth in claim 10 and including locking means for locking said supporting member in each of said operative positions associated with said selecting positions, and wherein one of said first control members is fixedly secured to said control shaft, and the other of said first control members is turnably mounted on said one first control member for movement relative thereto in said transverse direction, and wherein said control cam means when shifted in one direction on said shaft by said operating handle lever engages and actuates said other first control member for releasing said locking means and then engages and actuates said second control member for moving said supporting member from said operative position to said inoperative position.

12. For use with a variable gear transmission including a set of first stepped gears having a common axis, and a second gear for selectively cooperating with said first gears, a gear selecting arrangement comprising, in combination, a supporting member for supporting the second gear; supporting means extending parallel to the axis of said first gears and supporting said supporting member for movement in axial direction between a plurality of axially displaced selecting positions in which the second gear is respectively located opposite one of said first gears, said supporting means supporting said supporting member in each of said selecting positions for turning movement in a transverse direction toward and away from the respective first gear between an inoperative position and an operative position in which the second gear meshes with the respective first gear; a control shaft having an axis transverse to the axis of said first gears; a control cam means mounted on said control shaft for movement in axial direction of the same; locking means for locking said supporting member in said operative positions and including a resilient catch member mounted on said supporting member; a first control member fixedly secured to said control shaft for turning movement therewith and being located on one side of said supporting member; a locking control lever pivotally mounted on said first control member, said locking control lever being located on the other side of said supporting member for shifting together with said first control member said supporting member between said selecting positions during turning movement of said control shaft, said locking control lever having a cam follower engaging said control cam means and being operated by the same, said locking control member being operatively connected to said catch means for operating said locking means; a second control member turnably mounted on said first control member and having a cam follower portion engaging said control cam means and being operated by the same, said second control member engaging said supporting member for shifting the same between said operative and inoperative positions; and a single manually operated operating means including an operating member connected to said control shaft for turning movement therewith, and an operating handle lever mounted on said operating member for turning movement about an axis extending transverse to said axis of said control shaft and being connected to said operating member for turning movement with the same, said handle lever being connected to said cam means for moving the same on said control shaft.

13. A gear selecting arrangement as set forth in claim 12 and including pointer means connected to said operating member; and stationary dial means cooperating with said pointer means for indicating the selecting positions of said supporting member so as to indicate the ratio of the transmission and thread data.

14. A gear selecting arrangement as set forth in claim 12 wherein said supporting member includes a tubular extension located between said first control member and said locking control lever and being guided between the same in transverse direction; wherein said resilient catch means is located in said tubular extension; wherein said locking means include an engaging member fixedly connected to said resilient catch means and being located outside of said tubular extension, and include a stationary locking member having a set of locking recesses respectively engaged by said resilient catch means in said operative positions of said supporting means; wherein said engaging member is engaged by said locking control lever for withdrawing said resilient catch means from an associated locking recess; wherein said cam means first operates said locking control lever for withdrawing said catch means from a locking recess, and then operates said second control member for moving said supporting member from said operative position to said inoperative position; and including spring means for urging said supporting member to said operative positions.

15. A gear selecting arrangement as set forth in claim 14 wherein said cam means has an oblique front face portion and a cylindrical face cooperating with said cam follower of said locking control lever so that said resilient catch means is retracted during engagement of said cam follower of said locking control lever with said oblique front face portion, and is held in retracted position releasing said locking means while said cam follower of said locking control lever engages said cylindrical face, said cam follower of said locking control lever sliding on said cylindrical face during turning movement of said control shaft under the action of said operating member.

16. A gear selecting arrangement as set forth in claim 15 wherein said cam means has a circular groove; and including a fork member having a pair of opposite pins located in said groove of said cam means and being connected to said operating handle lever so that turning of said handle lever shifts said cam means on said control shaft while said cam means is free to turn under the action of said operating member.

17. A gear selecting arrangement as set forth in claim 16 and including adjustable means connecting said operating handle lever with said fork member; and other adjustable means connecting said control shaft with said operating member.

18. A gear selecting arrangement as set forth in claim 15 wherein said cam means has an annular front face portion located inwardly of said oblique front face portion and extending perpendicular to the axis of said control shaft, and wherein said cam follower of said locking control lever cooperates with said oblique face portion and with said cylindrical face of said cam means, and wherein said cam follower portion of said second control member cooperates with said annular front face portion of said cam means.

19. For use with a variable gear transmission including a set of first gears, and a second gear for selectively cooperating with said first gears, a gear selecting arrangement comprising, in combination, a support means for supporting the second gear and being movable between a plurality of selecting positions in which the second gear is respectively located opposite one of said first gears, said support means being movable in each of said selecting positions toward and away from the respective first gear between an inoperative position and an operative position in which the second gear meshes with the respective first gear; and operating control means operatively connected to said support means for actuating the same, and including a first operating member operatively connected to said support means and being turnable about a first axis for moving said support means between said selecting positions, and a second operating member operatively connected to said support means and being mounted on said first operating member for turning movement about a second axis transverse to said first axis for moving said support means between said inoperative and operative positions, said second operating member being movable with said first operating member about said first axis.

20. For use with a variable gear transmission including a set of first gears, and a second gear for selectively cooperating with said first gears, a gear selecting arrangement comprising, in combination, a support means for supporting the second gear and being movable between a plurality of selecting positions in which the second gear is respectively located opposite one of said first gears, said support means being movable in each of said selecting position toward and away from the respective first gear between an inoperative position and an operative position in which the second gear meshes with the respective first gear; locking means for locking said support means in each of said selecting positions in the respective operative position; and operating control means operatively connected to said support means for actuating the same, and including a first operating member operatively connected to said support means and being turnable about a first axis for moving said support means between said selecting positions, and a second operating member operatively connected to said support means and to said locking means, said second operating member being mounted on said first operating member for turning movement about a second axis transverse to said first axis for moving said support means between said inoperative and operative positions and for releasing said locking means before moving said support means from said operative position to said inoperative position, and for actuating said locking means to lock said support means in each of said operative positions, said second operating member being movable with said first operating member about said first axis.

21. For use with a variable gear transmission including a set of first gears, and a second gear for selectively cooperating with said first gears, a gear selecting arrangement comprising, in combination, a support means for supporting the second gear and being movable between a plurality of selecting positions in which the second gear is respectively located opposite one of said first gears, said support means being movable in each of said selecting positions toward and away from the respective first gear between an inoperative position and an operative position in which the second gear meshes with the respective first gear; control means for moving said support means between said selecting positions, and including a cam means for moving said support means in each of said selecting positions between said inoperative and operative positions; and operating means operatively connected to said control means for actuating the same, and including a first operating member operatively connected to said control means and being turnable about a first axis for actuating said control means to move said support means between said selecting positions, and a second operating member operatively connected to said control means and being mounted on said first operating member for turning movement about a second axis transverse to said first axis for actuating said cam means to move said support means between said inoperative and operative positions, said second operating member being movable with said first operating member about said first axis.

22. For use with a variable gear transmission including a set of first gears, and a second gear for selectively cooperating with said first gears, a gear selecting arrangement comprising, in combination, a support means for supporting the second gear and being movable between a plurality of selecting positions in which the second gear is respectively located opposite one of said first gears, said support means being movable in each of said selecting positions toward and away from the respective first gear between an inoperative position and an operative position in which the second gear meshes with the respective first gear; locking means for locking said support means in each of said selecting positions in the respective operative position; control means for moving said support means between said selecting positions and including a cam means for moving said support means in each of said selecting positions between said inoperative and operative positions and for operating said locking means; and operating means operatively connected to said control means for actuating the same and including a first operating member operatively connected to said control means and being turnable about a first axis for actuating said control means to move said support means between said selecting positions, and a second operating member operatively connected to said cam means and to said locking means, said second operating member being mounted on said first operating member for turning movement about a second axis transverse to said first axis for actuating said cam means to move said support means between said inoperative and operative positions and to release said locking means before effecting movement of said support means from said operative position to said inoperative position and to actuate said locking means to lock said support means in each of said operative positions, said second operating member being movable with said first operating member about said first axis.

References Cited in the file of this patent

UNITED STATES PATENTS

| | | |
|---|---|---|
| 2,548,337 | Barraco | Apr. 10, 1951 |
| 2,662,417 | Mascherpa | Dec. 15, 1953 |